United States Patent
Smith et al.

(10) Patent No.: US 11,790,337 B2
(45) Date of Patent: *Oct. 17, 2023

(54) AUTOMATED TELLER MACHINE (ATM) INCLUDING AN APPLICATION PROGRAMMING INTERFACE (API)-EQUIPPED, EMBEDDED MOBILE COMPUTER

(71) Applicant: Bank of America Corporation, Charlotte, NC (US)

(72) Inventors: Brian Joseph Smith, St. Augustine, FL (US); Todd M. Goodyear, New Hope, PA (US); Sidney R. Roper, Jacksonville, FL (US); John P. Rice, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/492,828

(22) Filed: Oct. 4, 2021

(65) Prior Publication Data

US 2023/0105353 A1    Apr. 6, 2023

(51) Int. Cl.

| | |
|---|---|
| *G06Q 20/14* | (2012.01) |
| *G06Q 20/10* | (2012.01) |
| *G06Q 20/40* | (2012.01) |
| *G06Q 20/38* | (2012.01) |
| *G06F 16/182* | (2019.01) |

(Continued)

(52) U.S. Cl.
CPC ......... *G06Q 20/1085* (2013.01); *G06F 9/541* (2013.01); *G06Q 20/02* (2013.01); *G06Q 20/204* (2013.01); *G06Q 20/327* (2013.01); *G06Q 20/3223* (2013.01); *G06Q 20/3224* (2013.01); *G06Q 20/4012* (2013.01); *G06Q 20/4015* (2020.05); *G06Q 20/40145* (2013.01);

(Continued)

(58) Field of Classification Search
CPC ............................................. G06Q 20/00-425
USPC ...................................................... 705/50-79
See application file for complete search history.

(56) References Cited

U.S. PATENT DOCUMENTS 7,494,047 B2 * 2/2009 Shepley ............. G06Q 20/1085
902/8
8,479,985 B1 * 7/2013 Kropt .................... G07F 19/211
235/382

(Continued)

FOREIGN PATENT DOCUMENTS

EP       2913975 A2 *  9/2015   ............. G06F 21/10

*Primary Examiner* — John W Hayes
*Assistant Examiner* — Chenyuh Kuo
(74) *Attorney, Agent, or Firm* — Weiss & Arons LLP

(57) ABSTRACT

An ATM system includes a back-end server, an ATM central processing unit (ATM CPU) that receives information relating to the ATM system and a mobile computer. The mobile computer provides a CPU (MC CPU) and a keypad. The mobile computer may also provide a touch screen configured to display an initial ATM display. The ATM system also includes an interface system for interfacing between the ATM CPU and MC CPU. The back-end server formats and transmits to the ATM an API call. The API call requests a location of the user, ATM device information, and identification information of the user. The mobile computer is configured to respond to the API call by providing the location, the ATM device information, and the identification information of the user to the back-end server.

15 Claims, 11 Drawing Sheets

(51) Int. Cl.
    *G06Q 20/02*         (2012.01)
    *G06Q 20/32*         (2012.01)
    *G06Q 20/20*         (2012.01)
    *G06F 9/54*           (2006.01)
    *G06V 20/52*         (2022.01)
    *G06F 3/04886*     (2022.01)
    *G06F 3/02*           (2006.01)

(52) U.S. Cl.
    CPC ............ *G06V 20/52* (2022.01); *G06F 3/0202* (2013.01); *G06F 3/04886* (2013.01)

(56) References Cited

U.S. PATENT DOCUMENTS

| | | | |
|---|---|---|---|
| 8,684,613 B2* | 4/2014 | Weber | G06F 1/1626 |
| | | | 396/448 |
| 8,972,297 B2* | 3/2015 | Kay | G07F 19/211 |
| | | | 705/1.1 |
| 10,275,827 B2* | 4/2019 | McCarthy | G06Q 40/02 |
| 11,308,481 B1* | 4/2022 | Thomas | G06Q 20/4012 |
| 11,448,747 B2* | 9/2022 | Patole | G06F 3/04847 |
| 11,449,874 B2* | 9/2022 | Benkreira | G06Q 20/4012 |
| 2019/0303626 A1* | 10/2019 | Kaladgi | G06F 21/84 |
| 2019/0311361 A1* | 10/2019 | Kumar | G06Q 20/4015 |
| 2020/0005262 A1* | 1/2020 | Arora | G06Q 20/3224 |
| 2022/0180365 A1* | 6/2022 | McCarley | G06Q 20/326 |

\* cited by examiner

US 11,790,337 B2

AUTOMATED TELLER MACHINE (ATM) INCLUDING AN APPLICATION PROGRAMMING INTERFACE (API)-EQUIPPED, EMBEDDED MOBILE COMPUTER

FIELD OF TECHNOLOGY

Aspects of the disclosure relate to computer systems. Specifically, aspects of the disclosure relate to Automated Teller Machines (ATMs).

BACKGROUND OF THE DISCLOSURE

This application relates to specialized ATMs. ATMs have become ubiquitous in the Financial Institution (FI) industry. Almost every customer-facing financial center includes an ATM. ATMs, however, are limited in their functions. Specifically, ATMs are designed by FIs for their respective use in a customer-facing financial center. As such, ATMs fail to benefit from the hardware and software revolutions of recent years.

It would be advantageous for ATMs to take advantage of the recent advances in computer technology.

It would be more desirable for ATMs to incorporate hardware that could be upgraded independently from the rest of the ATMs.

It would be even more desirable for ATMs to incorporate hardware that could itself be upgraded to add new and different security encryption schemes or other suitable applications over time.

SUMMARY OF THE DISCLOSURE

It is an object of this disclosure to enable ATMs to take advantage of the recent advances in computer technology.

It is an additional object of this disclosure to incorporate hardware in ATMs that could be upgraded independently from the rest of the ATMs.

It is yet another object of this disclosure to incorporate hardware in ATMs that could itself be upgraded to add new and different security encryption schemes or other suitable applications over time.

A method for enhancing detecting of onlookers proximal to an automated teller machine (ATM) is provided. The ATM may include an ATM central processing unit (ATM CPU). The method may receive user identification information in the form of a PIN entered by a user. The onlooker detection system may include a mobile computer. The mobile computer may provide an onlooker detection system CPU (ODS CPU), a keypad configured to receive user identification information in the form of a PIN entered by the customer and a touch screen configured to display, in the event that the ODS CPU determines that a data structure associated with the information corresponding to the PIN entered by a user corresponds to a valid PIN, an initial ATM display that comprises multiple transaction options. The touch screen may include a touch screen having a diagonal dimension of between about 9 inches and about 17 inches. The multiple transaction options may include a cash withdrawal transaction option.

The method may further include interfacing between the ATM CPU and ODS CPU in order to exchange information therebetween. The information may include a cash withdrawal amount and onlooker detection information.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
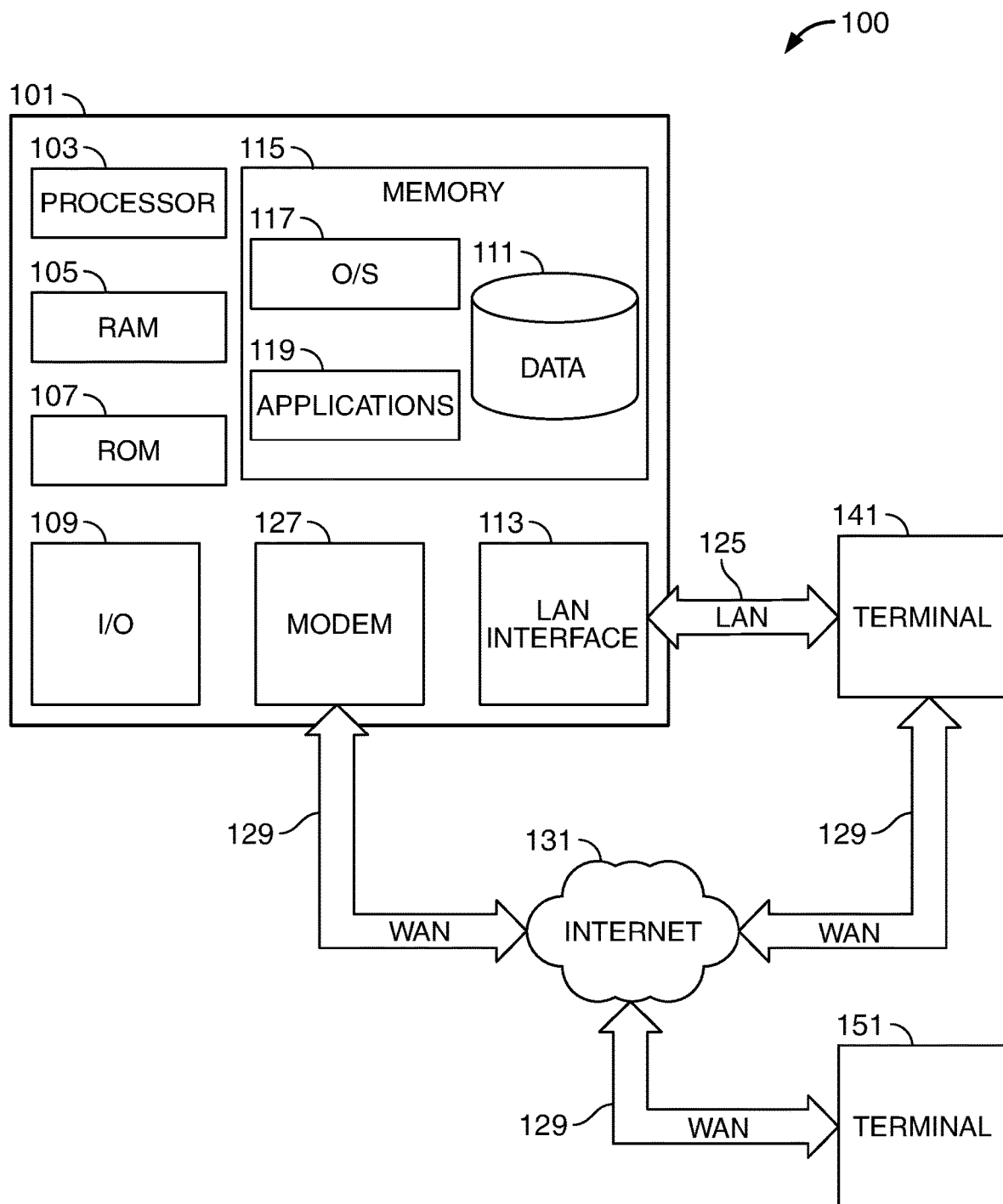
FIG. 1 shows an illustrative block diagram of a system for use in accordance with principles of the disclosure.

The current disclosure involves a combination automated teller machine (ATM) system and an onlooker detection system. The system preferably leverages an ATM central processing unit (ATM CPU) that receives information relating to the ATM. The system also includes an ATM dispenser configured to dispense a cash withdrawal amount in the event that the ATM CPU receives information relating to a selection of a cash withdrawal amount.

The ATM system is preferably combined with an onlooker detection system comprising a mobile computer. The mobile computer may include an onlooker detection system CPU (ODS CPU), a keypad configured to receive user identification information in the form of a PIN entered by the customer and the identification of the cash withdrawal amount.

It should be noted that the keypad may form part of the ATM that is separate from the mobile computer.

The mobile computer may also include a touch screen configured to display, in the event that the ODS CPU determines that a data structure associated with the information corresponding to the PIN entered by a customer corresponds to a valid PIN, multiple transaction options. The touch screen may have a diagonal dimension of between 9 inches and 17 inches, or some other suitable diagonal dimension, and may display an initial ATM display that comprises multiple transaction options. In some embodiments, the multiple transaction options may include a cash withdrawal transaction option.

In some embodiments, the mobile computer may also include an interface system that interfaces between the ATM CPU and ODS CPU.

In some embodiments, the mobile computer may include a camera. The mobile computer may be configured to use the camera to recognize the customer and/or monitor the area surrounding a customer in order to detect a presence of an onlooking entity. The entity may be within a threshold distance of the camera such that, under certain circumstances, the entity would be able to recognize and retrieve customer information, such as a PIN. The PIN may be retrieved from the keypad portion of the mobile computer. When the entity is determined to be within threshold distance, the mobile computer may be configured to take certain actions, as are described in more detail hereinbelow.

In certain embodiments, the mobile computer may include a radio signal detection utility. The radio signal detection utility may be configured to, using the ODS CPU, recognize an electronic device associated with an entity within a threshold distance of the ATM. Such an entity may be a suspicious onlooker. Such an onlooker may potentially compromise the security of the ATM user.

It should be noted that communications involving detection, retrieval and/or broadcast of such radio signals are set forth in commonly-assigned, co-pending, U.S. patent application Ser. No. 16/021,854, filed on Jun. 28, 2018, entitled, "WEARABLE DEVICE FOR OPERATIONAL COMPLIANCE," which is hereby incorporated by reference herein in its entirety.

In certain embodiments, the mobile computer may be configured to retrieve and store device and environmental/geospatial based identification information associated with the onlooker's electronic device. In these or other embodiments, the mobile computer may be configured to retrieve identification information associated with the onlooker's electronic device.

Certain embodiments of the mobile computer may include a keypad. The keypad may take the form of a physical-button-based keypad and/or a touch screen keypad. It should be noted that a soft or hard keypad on the mobile computer may work in tandem with hard or soft buttons arranged on the ATM itself.

It should be noted that the interface system described above may include a vendor-recommended connector(s). The interface system may include a preferably vendor-recommended USB-type connector. The interface system may include one connector or multiple connectors. It should be noted that the connector may be dedicated to supporting an electronic connection between the mobile computer and the ATM. It should be noted that, in certain configurations, the connection may support a power transfer to the mobile computer. In other configurations, power may be provided to the mobile computer in a connection separate from the above-described connection between the mobile computer and the ATM.

Some embodiments set forth herein may include a method for enhancing detecting of onlookers proximal to an automated teller machine (ATM). The ATM may include an ATM central processing unit (ATM CPU).

The method may include using the mobile computer to receive user identification information in the form of a PIN entered by the customer and a cash withdrawal amount.

The onlooker detection system may include a mobile computer. The mobile computer may be configured to provide an onlooker detection system CPU (ODS CPU), a keypad configured to receive user identification information in the form of a PIN entered by the customer and a cash withdrawal amount. The keypad may take the form of a touch screen. The keypad may take the form of a physical-button-based keypad and/or a touch screen keypad. The touch screen may have a diagonal dimension of between about 9 inches and about 17 inches.

The touch screen may be configured to display, in the event that the ODS CPU determines that a data structure associated with the information corresponding to the PIN entered by a customer corresponds to a valid PIN, an initial ATM display. The initial display may display multiple transaction options. The multiple transaction options may include a cash withdrawal transaction option.

The method may also include interfacing between the ATM CPU and ODS CPU in order to exchange information therebetween. The exchanged information may include, for example, the cash withdrawal amount and/or onlooker detection information.

The method may include using a camera mounted on, embedded in, or that otherwise forms part of, the mobile computer. The computer may be configured to recognize the customer and monitor an area surrounding the customer in order to detect a presence of an entity. The monitoring may trigger an identification action when the entity is found within a threshold distance of the camera. In such an area, the entity may be sufficiently close to retrieve the customer information from the ATM.

The method may further include using a radio signal detection utility located in the mobile computer to recognize an electronic device associated with an entity within a threshold distance of the ATM.

Using the mobile computer, the method may retrieve environmental/geospatial based identification information associated with the electronic device.

The method may further involve using a vendor recommended USB-type connector to perform the functions of the interface system.

Certain embodiments may leverage a tablet computer associated with a pre-determined vendor. For example, certain embodiments may use a tablet computer produced by Apple Computing of Cupertino, California. Such embodiments may further leverage a particular app. configured for use on the tablet computer. For example, such embodiments may leverage the Center Stage™ app. (hereinafter, Center Stage) for use in onlooker detection.

Center Stage may preferably be configured for use with an iPad Pro™ or other suitable mobile computer. Specifically, Center Stage may be configured for use with the iPad Pro's 12-megapixel ultra-wide TrueDepth camera, along with machine learning technology embedded in the tablet computer, to recognize an ATM user and maintain the user in center view. Preferably, as the ATM user moves around during a video call on the iPad Pro, Center Stage automatically pans the camera to keep the user in the shot.

In the disclosed embodiments, Center Stage, and the iPad Pro 12-Megapixel ultra-wide TrueDepth camera, may be leveraged to pan the ATM user's surroundings. This panning of the surroundings may be used to determine if onlookers are within a pre-determined proximity of the user, and/or to monitor onlooker behavior. When onlookers are determined to be within the pre-determined proximity—Center Stage, or other suitable app. may be used to trigger a message to the iPad Pro. Such a message may include an executable file which, when onlookers are determined to be within the pre-determined proximity, may substantially immediately redact sensitive information from the screen, alert the user that the user may be under surveillance, and/or alert authorities of the possible security compromise.

In some embodiments, iPad Pro and/or Center Stage may recognize the onlookers and zoom out to fit everyone into the view. This view may, in turn, be displayed to the customer. Other alternative technology providers for such an app. include Facebook Portal and the Amazon Echo Show 10.

Center Stage also works with third-party apps like Zoom and Webex as well as FaceTime, and an API may be implemented for enabling communication between Center Stage and other apps. Leveraging such an API, which preferably standardizes Center Stage communications for use with other apps, may provide an ATM provider various options in determining the most appropriate choice for providing a tablet computer for use with legacy ATM systems and methods according to the disclosure herein. It should be noted that any suitable APIs may be leveraged for delivering and receiving information from the tablet and/or app. resident on the tablet. Such APIs may preferably enable ease of communication between, for example, the app and the tablet and/or communication between the app, the tablet and/or the ATM peripherals.

An example of a use of an API according to certain embodiments follows. One embodiment of an app involves originating an API call from an Apple back-end server to an Apple mobile computer. Nevertheless, there are device-based/app-initiated APIs that can return values to any back-end server, and not only to an Apple back-end server. The back-end server can take the values retrieved in response to the call and perform actions such as calculating, computing, determine workflow, author a script, pushing a security screen to an ATM, terminating an ATM session, etc.

In one use case according to the embodiments set forth herein, an app is coded to perform background location, using, for example, triangulation, of onlookers. The location information derived from onlooker locations, and other information such as electronic device information associated with the onlookers, may be sent to a back-end app server in response to an API call. The back-end server, can now "do something"—such as redact sensitive information from an ATM screen, post a security screen, notify an ATM user, trigger an alert, or other suitable action—because it has some API-derived knowledge that "Person A is at Location B which is within a pre-determined threshold of ATM C".

The foregoing is an exemplary workflow coded into the app, that calls (also referred to as "gets") API: "significant location", "device information", "logged-in ATM user".

The API 1) is not necessarily Apple-information specific; and 2) is an extension of the concepts described herein that relate to onlooker detection. The extension flows from the expansion of the ATM into the API-related space through the use of the tablet computer as the front end/keyboard/screen of the ATM.

That can happen, for example, by co-opting the Apple iPad technology, or other suitable mobile technology, and technology associated with an ATM back-end server that is equipped with an API such that the ATM back-end server can send API calls to the mobile computer to retrieve information. Once a suitable tablet computer is involved, device-to-device workflows can be introduced. These flows may include "customer—device with app"—to—FI App-Server"—to—"FI-Managed ATM/mobile computer screen".

While the disclosure herein is described in the context of leveraging an iPad Pro together with a Center Stage app. using API technology for onlooker detection it should be noted that disclosure includes using any suitable mobile computer embedded in an ATM for use with any suitable app. Such an app may be different from the Center Stage app. Such an app may preferably utilize a camera together with the tablet computer or that does not use a camera together with the tablet computer. In this way, the ATM embodiments, or other than ATM embodiments, may utilize API calls that can preferably leverage any suitable function that exists in a mobile computer or that exists in an app suitable for running on a mobile computer.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, other mobile computer or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to ATM functions. The various tasks may be related to functions that could supplement ATM functions, such as, for example, onlooker detection. It should be noted that, for the purposes of this application, onlooker detection should be understood to refer to an analysis and detection of an ATM user's surroundings to determine whether a mal-actor is within a distance of the ATM user that may be considered to possibly compromise the security of the ATM session.

Computer 101 and/or terminals 141 and 151 may also be devices including various other components, such as a battery, speaker, and/or antennas (not shown).

Terminal 151 and/or terminal 111 may be portable devices such as a laptop, cell phone, Blackberry™, tablet, smartphone, or any other suitable device for receiving, storing, transmitting and/or displaying relevant information. Terminals 151 and/or terminal 111 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. It should be noted that such modules may be considered, for the purposes of this application, as engines with respect to the performance of the particular tasks to which the modules are assigned.

Figure 2:
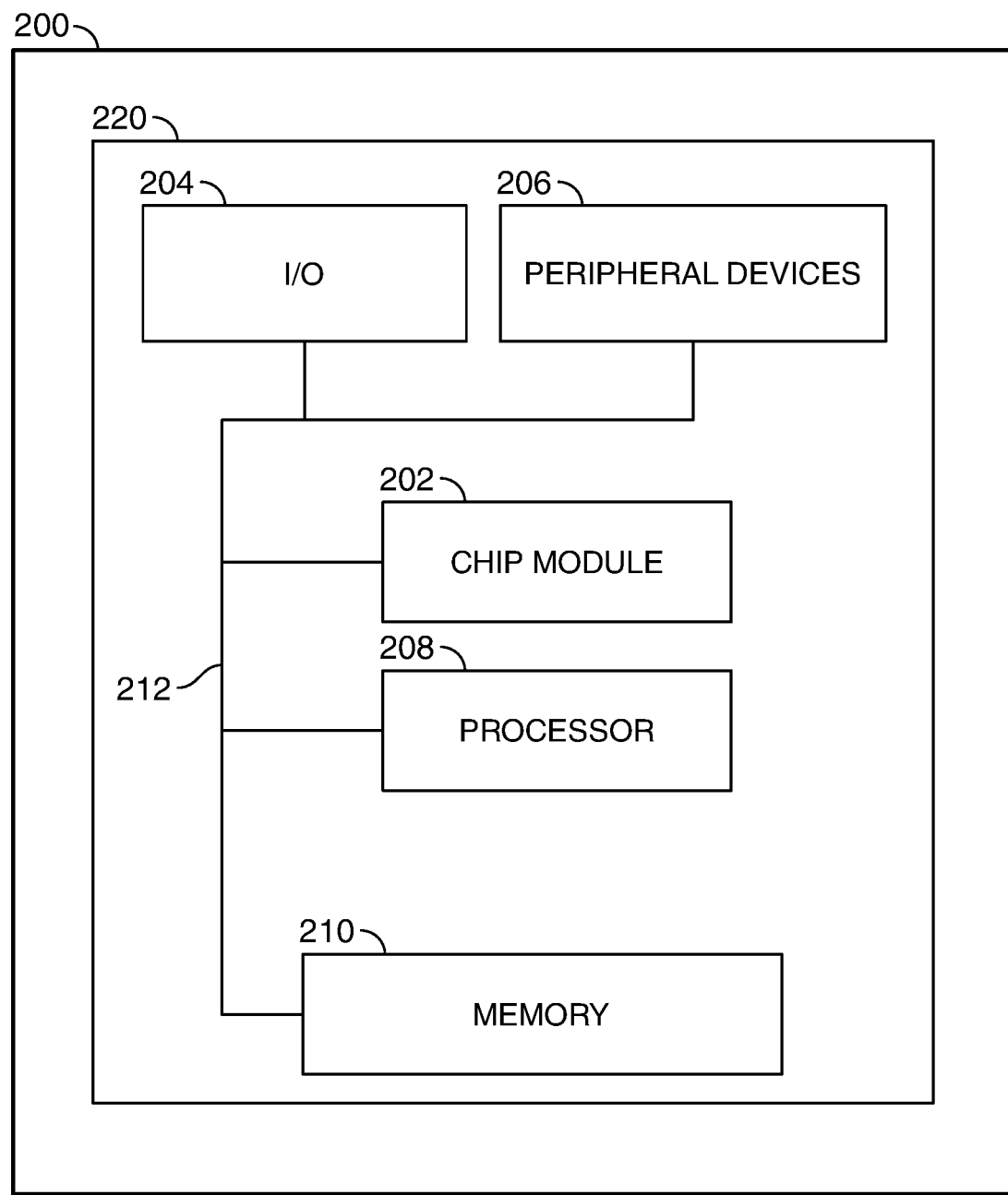
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
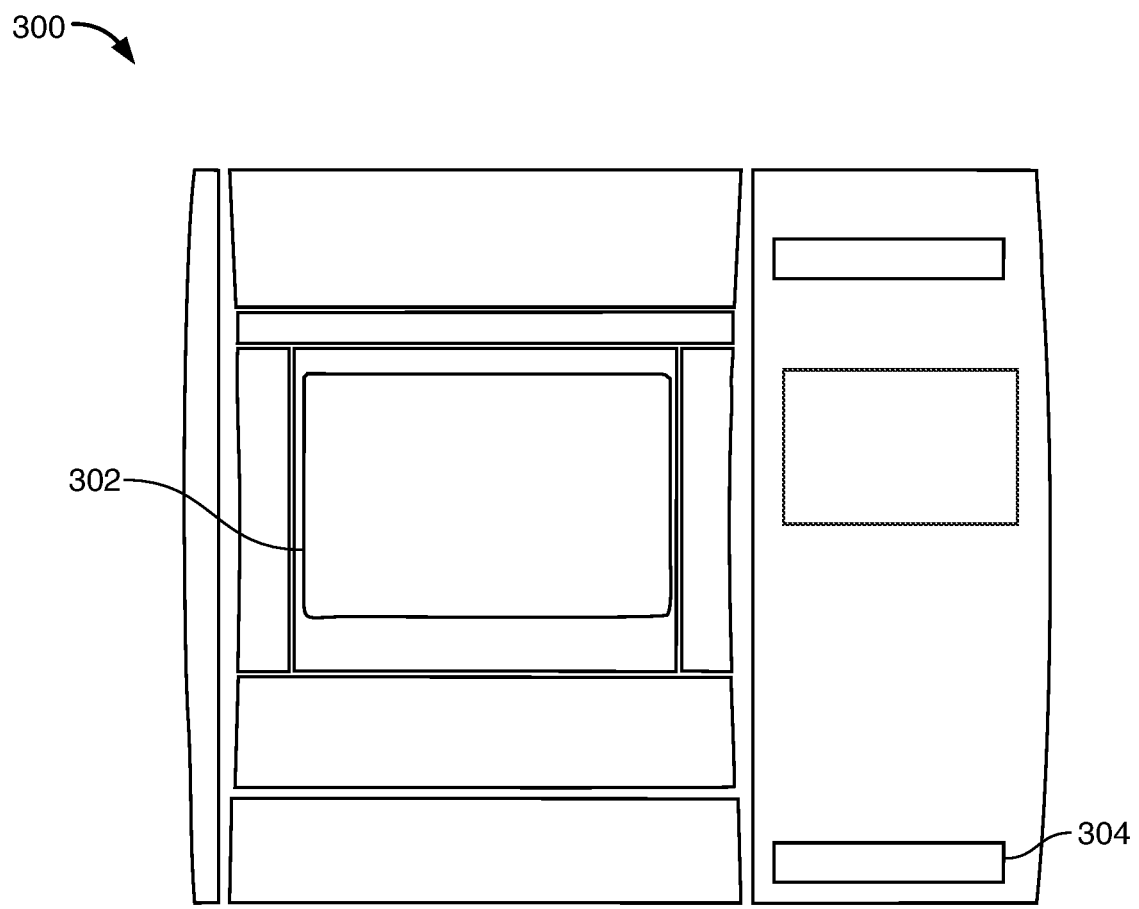
FIG. 3 shows an illustrative schematic diagram of an ATM with a front screen removed according to the disclosure.

FIG. 3 shows an illustrative schematic diagram of an ATM 300 with a front screen removed according to the disclosure. ATM 300 preferably provides a socket 302 and cash/check slot 304 for insertion of a cash or check or other document (or removal thereof) of a mobile computer according to the disclosure. Socket 302 preferably is adapted to house a preferably entity-provided mobile computer. Socket 302 should preferably be configured such that various features of a mobile computer, such as a camera lens, is free of obstruction from surrounding ATM socket 302.

Figure 4:
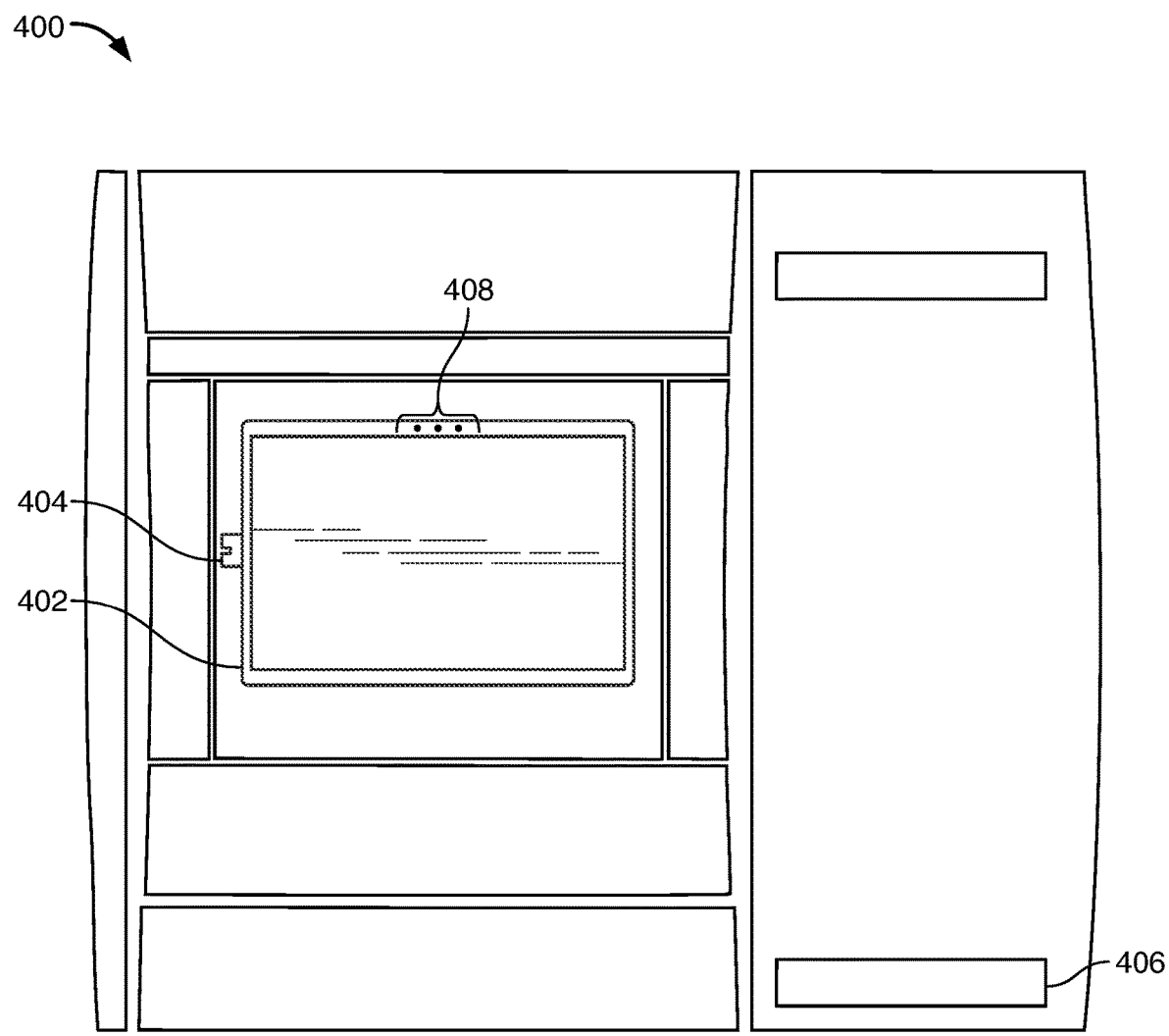
FIG. 4 shows an illustrative diagram of an ATM with a front screen removed and replaced with a tablet computer according to the principles of the disclosure.

FIG. 4 shows an illustrative diagram of an ATM 400 with a front screen removed and replaced with a mobile—e.g., a tablet—computer 402. Slot 406 is also shown in FIG. 4.

Mobile computer 402 preferably includes an interface, shown schematically at 404, and an embedded camera 408. Interface 404 preferably provides an interface for interfacing with ATM 400. Interface 404 can preferably provide the various signals from computer 402 to ATM 400 and from ATM 400 to computer 402.

Signals from computer 402 may include user input signals. Signals from computer 402 may also include signals from camera 408. Signals from camera 408 may be processed and parsed using an app such as the Center Stage app. described above. Signals from computer 402 may be signals involving environmental factors such as onlooker locations, or other relevant information. In fact, the signals that can be exchanged between computer 402 and ATM 400 include any relevant signals that may involve operation of ATM 400 or operation of computer 402 or any of ATM peripherals (not shown.)

Figure 5:
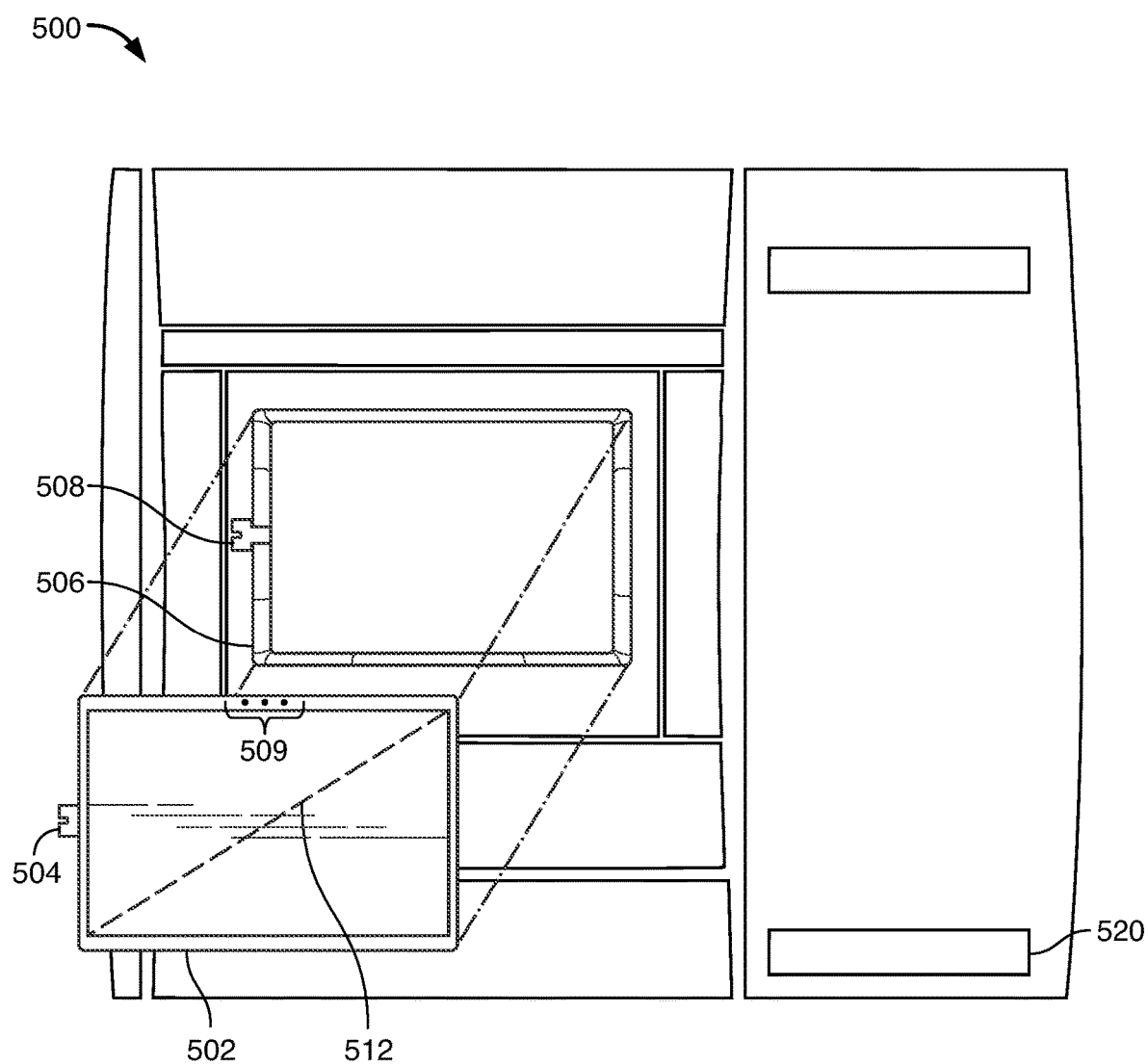
FIG. 5 shows another illustrative diagram of an ATM with a front screen removed and replaced with a mobile computer according to the principles of the disclosure.

FIG. 5 shows another illustrative diagram of an ATM 500 with a front screen removed and replaced with a mobile computer 502 according to the principles of the disclosure. In FIG. 5, mobile computer 502 is shown having interface 504 and camera 509.

Also shown is diagonal dimension 512 which indicates the screen size of mobile computer 502. Typically, mobile computer screen size is measured by the diagonal distance from corner to corner. It should be noted that the most preferable diagonal dimension 512 for the screen size of mobile computer 502 is between 9 inches and 17 inches. However, any suitable dimension for the screen is within the disclosure of this application.

The outer edge of socket 506 is also shown. In addition, slot 520 and camera 509 are also shown in FIG. 5.

Figure 6A:
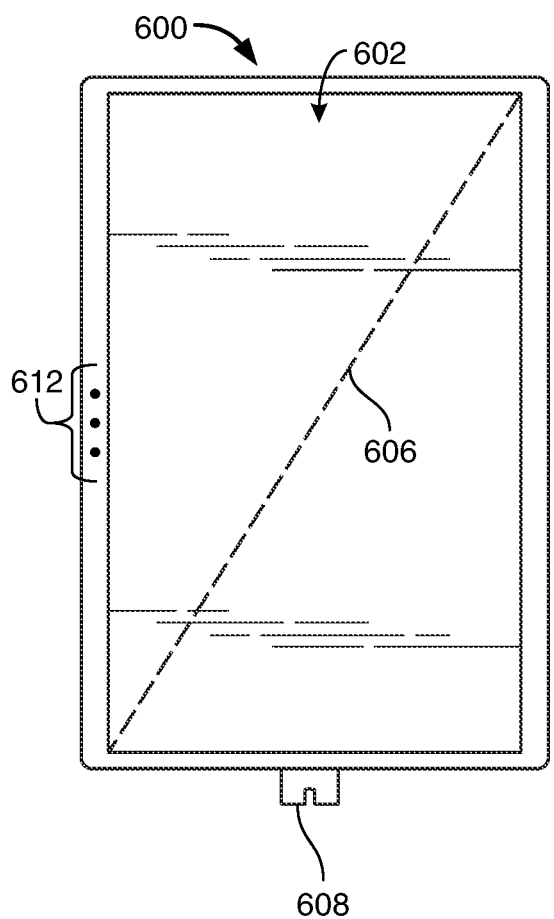
FIGS. 6A and 6B show an illustrative diagram of a mobile computer with a front screen and a back face according to the principles of the disclosure.

FIG. 6A shows an illustrative diagram of a mobile computer 600 with a front screen 602, a diagonal screen dimension 606, a camera 612 and an interface 608 according to the principles of the disclosure.

Figure 6B:
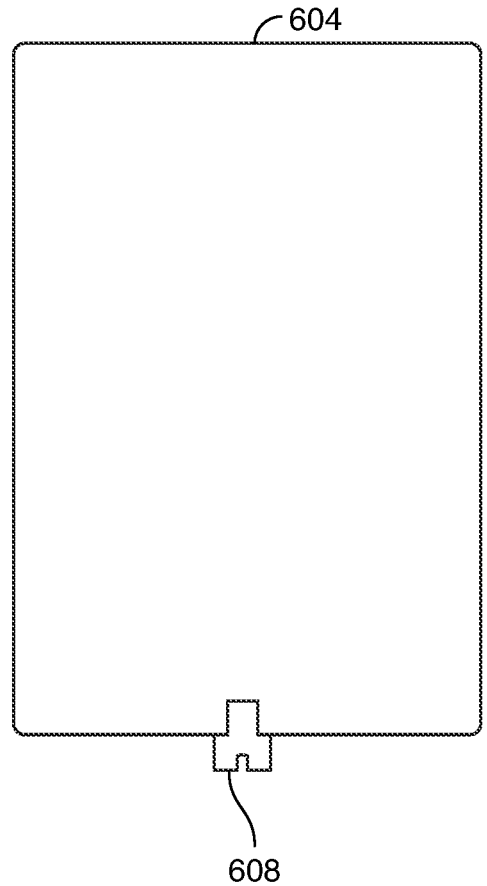

FIG. 6B shows back face 604 and the other side of interface 608.

Figure 7:
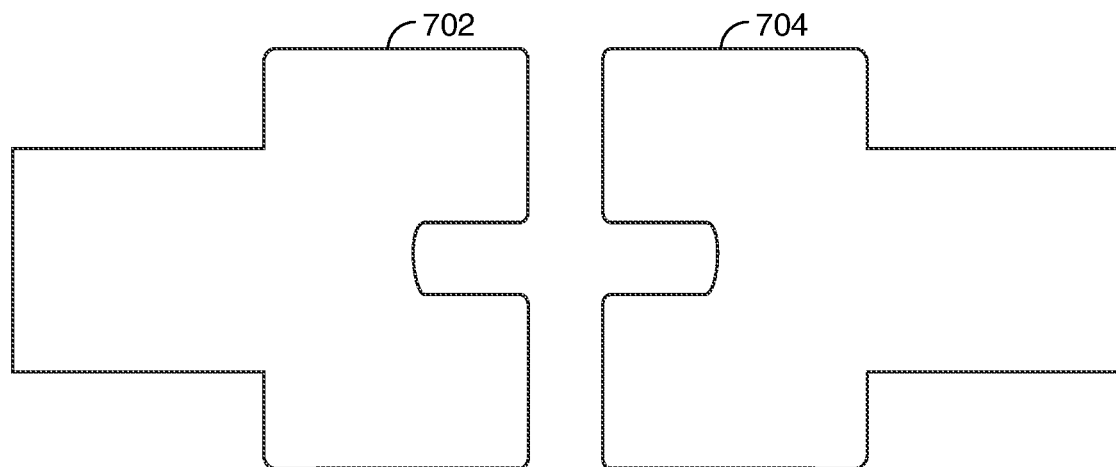
FIG. 7 shows plugs that may be used to interface between a mobile computer and an ATM according to the principles of the disclosure.

FIG. 7 shows a schematic diagram of plug 702 and a mating plug 704 that may be used to interface between a mobile computer and an ATM according to the principles of the disclosure.

Figure 8:
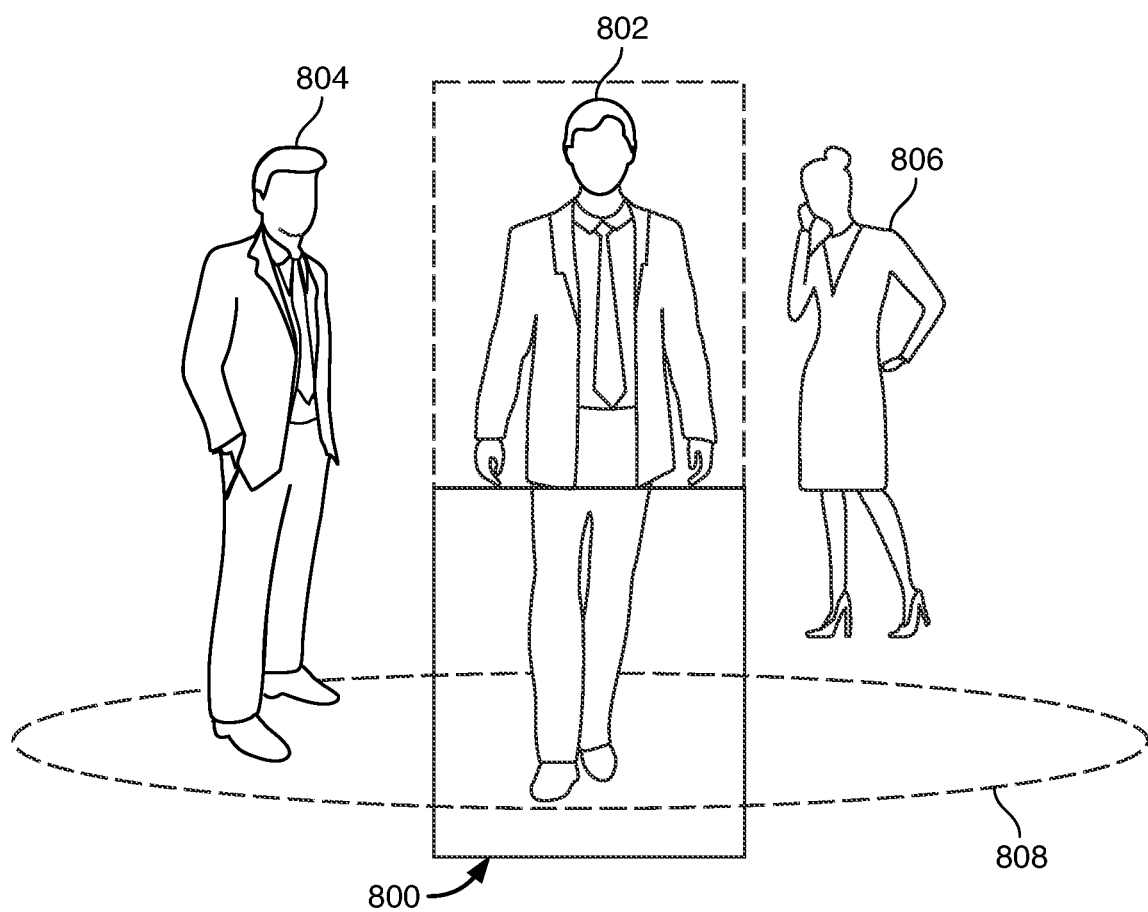
FIG. 8 shows an ATM for use with one of a group of people according to the principles of the disclosure.

FIG. 8 shows a schematic diagram of the back face of an ATM 800. An ATM user 802 is shown as well as a proximal onlooker 804 and a distal onlooker 806.

Proximal onlooker 804 is shown as standing within threshold distance 808 and distal onlooker is shown as standing outside threshold distance 808. In certain embodiments, threshold distance 808 may be used to determine whether the system will consider the onlooker as suspicious and, in response thereto, trigger mitigating action including, but not limited to, terminating the current session, alerting the ATM user 802, or other suitable actions.

Figure 9:
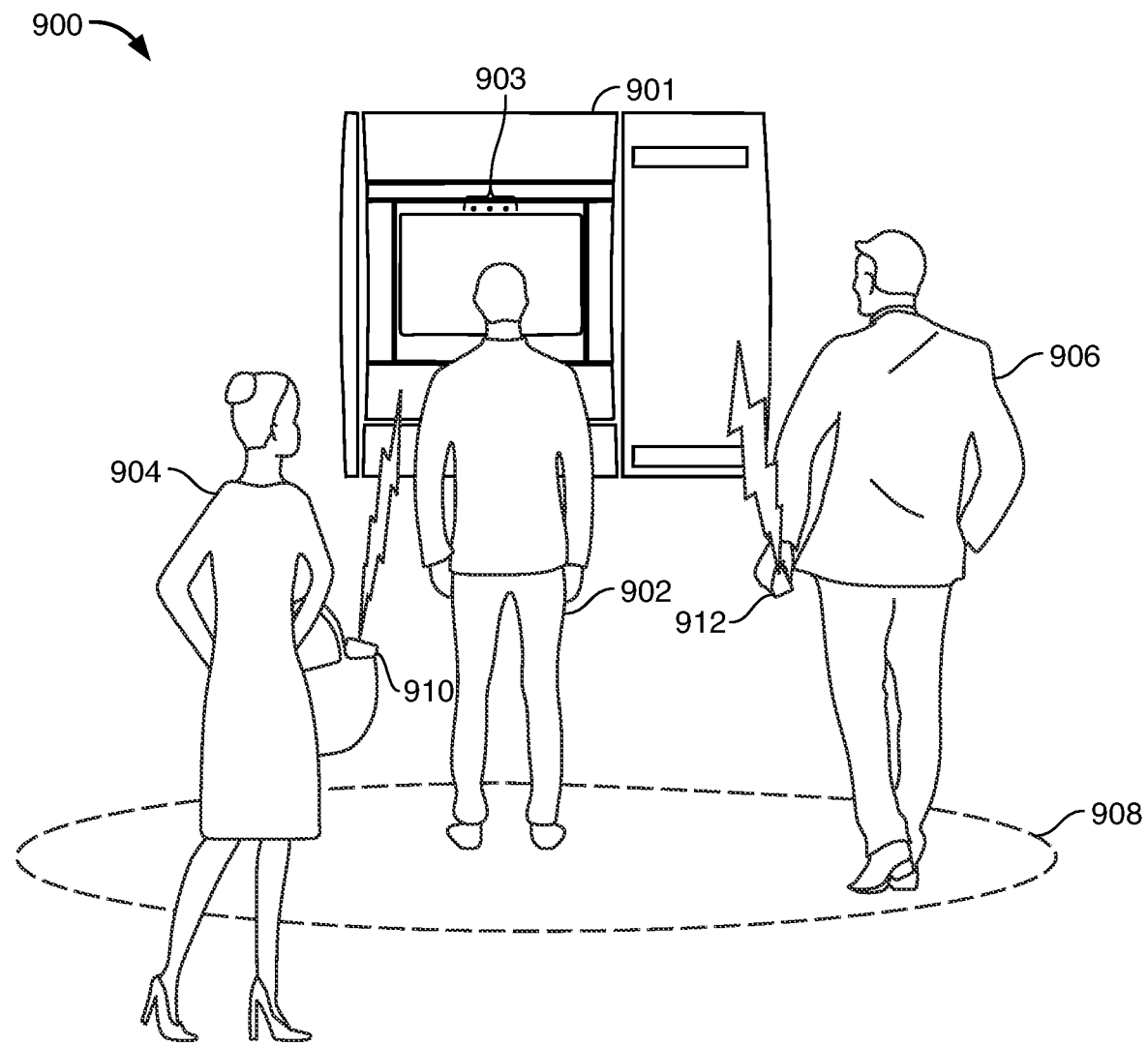
FIG. 9 shows another ATM for use with one of a group of people according to the principles of the disclosure.

FIG. 9 shows another ATM for use with one of a group of people according to the principles of the disclosure. FIG. 9 shows an ATM 900 with an ATM screen 901 including camera 903, and ATM user 902. Also shown in FIG. 9 are onlookers 904 and 906 as well as an indication of threshold distance 908.

It should be noted that onlooker 904 may be considered outside threshold distance 908 while onlooker 906 may considered within threshold distance 908.

Onlooker 904 is shown in possession of first mobile device 910 while onlooker 906 is shown in possession of second mobile device 912. In some embodiments, mobile computer 901 may be equipped with communication equipment whereby mobile computer 901 can preferably initiate and/or carry-on communication together with mobile device 910 or another suitable mobile device. During this communication, mobile computer 901 may be able to retrieve, under certain circumstances, identity information, or other relevant information, regarding onlooker 904 using mobile device 910 as a proxy for such information.

In certain embodiments, ATM 900 may be equipped with communication equipment as well. ATM 900 may, under circumstances, be configured to initiate communication with mobile device 912, or other relevant mobile device.

Figure 10:
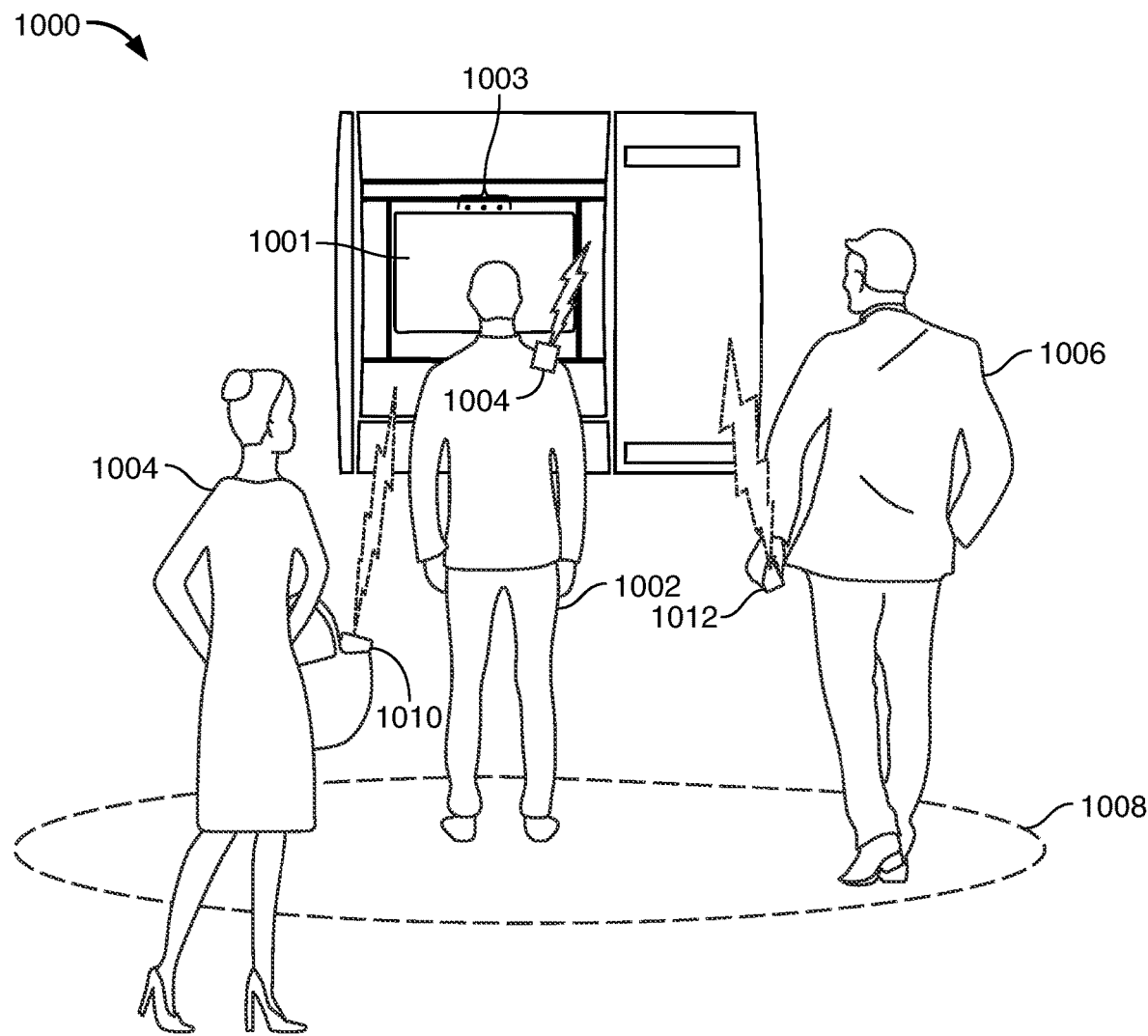
FIG. 10 shows yet another ATM for use with one of a group of people according to the principles of the disclosure.

FIG. 10 shows yet another ATM 1000 for use with one of a group of people according to the principles of the disclosure. FIG. 10 shows an ATM user 1002, and onlookers 1004 and 1006. Onlooker 1004 is shown as possessing mobile device 1010 while onlooker 1006 is shown as possessing mobile device 1012. In addition, user 1002 is shown as possessing mobile device 1014. It should be noted that the ATM 1000 or mobile computer 1001 can be in communication with any of mobile devices 1010, 1012 and/or 1014. Furthermore—mobile device 1002 can be in communication with other mobile devices 1010 and/or 1012 to the extent necessary to identify or otherwise interact with the other devices.

Figure 11:
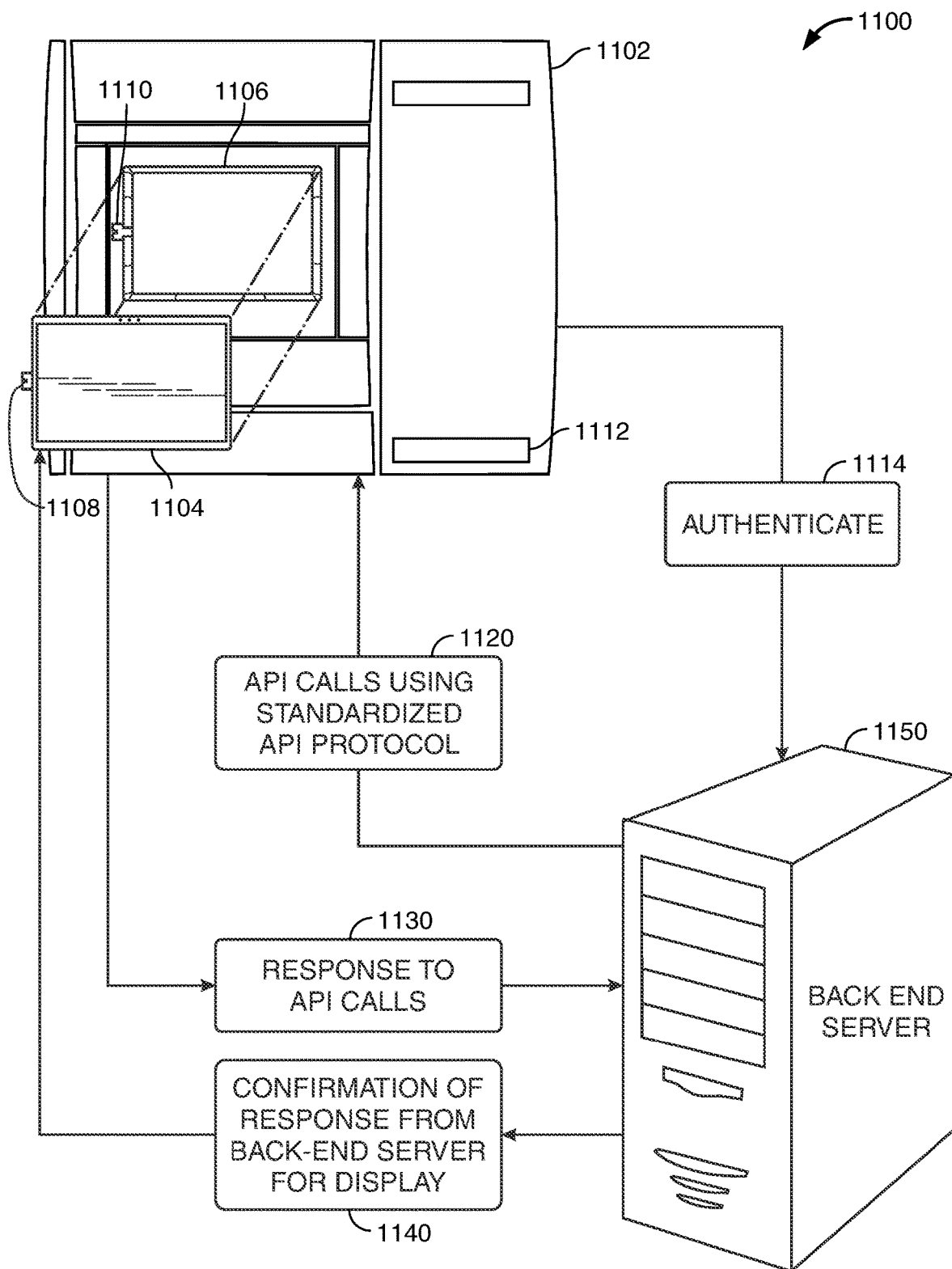
FIG. 11 shows an illustrative process for use according to the principles of the disclosure.

FIG. 11 shows an illustrative process 1100 for use according to the principles of the disclosure. Process 1100 is implemented using ATM 1102. ATM 1102 includes a slot 1112 for cash/checks insertion and removal, a socket 1106 which is configured to hold a mobile computer 1104 and an interface 1110 configured to interface with an interface 1108 associated with mobile computer 1104.

At 1114, ATM 1102 is shown as conducting an authorization communication 1114 with back end server 1150. Authorization communication 1114 preferably enables a user (not shown in FIG. 11) to conduct an ATM session with FI-entity-provided, mobile-computer equipped, ATM 1102.

Pursuant to the session initiated by the user, server 1150 preferably sends calls necessary to initiate the ATM session with the user, as shown at 1120. Such calls may, preferably, take advantage of standardized API protocol that may be available on mobile computer 1104.

At 1130, mobile computer 1104 and/or ATM 1102 is shown as responding to API calls 1120.

At 1140, server 1150 is shown as confirming response from server 1150 for display on mobile computer 1104.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer readable data structures.

Thus, methods and systems for providing an AUTOMATED TELLER MACHINE (ATM) ONLOOKER DETECTION are provided. Persons skilled in the art will appreciate that the present invention can be practiced by other than the described embodiments, which are presented for purposes of illustration rather than of limitation, and that the present invention is limited only by the claims that follow.

What is claimed is:

1. An automated teller machine (ATM) system comprising:

an ATM not comprising an ATM screen and comprising a socket;

a back-end server;

an ATM central processing unit (ATM CPU) that receives information relating to a user;

a mobile computer, the mobile computer configured for permanent installation in the socket, the mobile computer configured to provide:

a CPU (MC CPU);

a keypad configured to receive user identification information in the form of a PIN entered by the user, wherein, prior to authenticating the user at the ATM, said ATM is in communication with the back-end server that receives authentication information from the ATM, said authentication information for authenticating the user for a session at the ATM;

a touch screen configured to display, in the event that the MC CPU determines that a data structure associated with the information corresponding to the PIN entered by a user corresponds to a valid PIN, said touch screen having a diagonal dimension of between 9 inches and 17 inches, an initial ATM display that comprises multiple transaction options; and an interface system that interfaces between the ATM CPU and MC CPU;

wherein the back-end server is configured to format and transmit to the ATM an application programming interface (API) call, said API call for requesting a location of the user, ATM device information, and identification information of the user, and the mobile computer is configured to respond to the API call by providing the location of the user, the ATM device information, and the identification information of the user to the back-end server.

2. The ATM system of claim 1, wherein the back-end server is configured to respond to the API call response generated by the mobile computer, said back-end server response which is further configured for display on the touch screen.

3. The ATM system of claim 1, the mobile computer further comprising a camera, said mobile computer further configured to use the camera to recognize the user and monitor a user surrounding in order to detect a presence of an entity, said entity within a pre-determined threshold distance of the camera.

4. The ATM system of claim 3, wherein the pre-determined threshold distance of the camera is determined by calculating the distance within which the entity can retrieve the authentication information.

5. The ATM system of claim 1, the mobile computer further comprising a radio signal detection utility, wherein the mobile computer is further configured to use the radio signal detection utility to recognize an electronic device associated with an entity within a pre-determined threshold distance of the ATM.

6. The ATM system of claim 5, wherein the mobile computer is further configured to store device and environmental/geo spatial based identification information associated with the electronic device.

7. The ATM system of claim 1, wherein the keypad is a physical-button-based keypad or a touch screen keypad.

8. The ATM system of claim 1, wherein the interface system further comprises a USB-type connector.

9. An automated teller machine (ATM) system, the ATM not comprising a screen and comprising a socket, the ATM further comprising:

an ATM central processing unit (ATM CPU) that receives information relating to the ATM;

an ATM dispenser configured to dispense a cash withdrawal amount in the event that the ATM CPU receives information relating to a selection of a cash withdrawal amount;

a mobile computer, the mobile computer configured for permanent installation in the socket, the mobile computer configured to provide:

a CPU (MC CPU);

a keypad configured to receive user identification information in the form of a PIN entered by a user, wherein, prior to authenticating a user at the ATM, said ATM is in communication with a back-end server that receives authentication information from the ATM, said authentication information for authenticating the user for a session at the ATM;

a touch screen configured to display, in the event that the MC CPU determines that a data structure associated with the information corresponding to the PIN entered by a user corresponds to a valid PIN, an initial ATM display that comprises multiple transaction options, wherein the multiple transaction options include a cash withdrawal transaction option; and an interface system that interfaces between the ATM CPU and MC CPU;

wherein a back-end server is configured to format and transmit to the ATM an application programming interface (API) call to request information regarding the session, and the mobile computer is configured to respond to the API call and the back-end server is configured to respond to an API call response generated by the ATM, said backend server response which is further configured for display on the touch screen.

10. The ATM system of claim 9, the mobile computer further comprising a camera, said mobile computer further configured to use the camera to recognize the user and monitor a user surrounding in order to detect a presence of an entity, said entity within a pre-determined threshold distance of the camera.

11. The ATM system of claim 10, wherein the pre-determined threshold distance of the camera is determined by calculating the distance within which the entity can retrieve the authentication information.

12. The ATM system of claim 9, the mobile computer further comprising a radio signal detection utility, wherein the mobile computer is further configured to use the radio signal detection utility to recognize an electronic device associated with an entity within a pre-determined threshold distance of the ATM.

13. The ATM system of claim 12, wherein the mobile computer is further configured to store device and environmental/geo spatial based identification information associated with the electronic device.

14. The ATM system of claim 9, wherein the keypad is a physical-button-based keypad or a touch screen keypad.

15. The ATM system of claim 9, wherein the interface system further comprises a USB-type connector.

\* \* \* \* \*